United States Patent [19]

Okuyama et al.

[11] 4,401,320
[45] Aug. 30, 1983

[54] DOOR FOR AUTOMOBILE

[75] Inventors: Hiroo Okuyama; Hideoki Matsuoka, both of Yokohama, Japan

[73] Assignee: Nissan Motor Co., Ltd., Yokohama, Japan

[21] Appl. No.: 199,864

[22] Filed: Oct. 23, 1980

[30] Foreign Application Priority Data

Oct. 25, 1979 [JP] Japan ............................ 54-138162

[51] Int. Cl.³ ............................................. A62B 35/00
[52] U.S. Cl. .................................. 280/801; 180/268; 200/61.62; 280/808; 296/208; 297/477; 307/10 SB
[58] Field of Search ...................... 280/806, 801, 808; 296/208; 297/477; 180/268–270, 468; 307/9, 10 R, 10 SB; 362/61; 200/61.62

[56] References Cited

U.S. PATENT DOCUMENTS 3,494,657 10/1970 Tantlinger et al. ................. 296/208
4,230,918 10/1980 Schroeder et al. .............. 200/61.62
4,284,295 8/1981 Takeja et al. ....................... 280/808

Primary Examiner—Richard A. Bertsch

[57] ABSTRACT

A door for an automobile disclosed herein comprises a glass run rubber embraced in a door frame for guiding a window glass, the glass run rubber formed with a channel for receiving a wire harness extending from a buckle for releasing a seat belt in an emergency to a belt wearing alarm device for warning with a signal a driver of a disconnection of the seat belt to the buckle, thereby eliminating a notch formed in the door frame which would reduce the rigidity of the door, preventing the wire harness from being cut by an edge of a notch formed in the door frame and eliminating extra parts for retaining the wire harness in the channel.

3 Claims, 7 Drawing Figures

DOOR FOR AUTOMOBILE

BACKGROUND OF THE INVENTION

1. Field of the Invention

The present invention relates to a door for an automobile, and more particularly to a door for an automobile, which carries an upper end of a shoulder belt as a seat belt.

2. Description of the Prior Art

As shown in FIGS. 1–3, a conventional door of such a kind has been composed of a door frame 1 and a glass 2 which is guided along glass run rubbers 3 embraced in the door frame 1 as shown in FIG. 3. On an outer periphery of the door frame 1 a weatherstrip 4 is provided.

As shown in FIG. 1, to the door frame 1 is fixed a support 6 at the upper end of the shoulder belt 5. The support 6 is provided with a buckle 7 for releasing the shoulder belt in an emergency. A wire harness 8 extends from the buckle 7 to a belt wearing alarm device (not shown) provided on an instrument panel or the like for warning with a signal a driver of a status that the shoulder belt is not connected to the buckle 7. In the prior art, for the purpose of guiding the wire harness 8, the cross-sectional configuration of the door frame 1 is modified to form a groove 9 for receiving the wire harness 8 therein as shown in FIG. 2.

In this case, however, the wire harness 8 tends to remove from the groove 9 and therefore in order to prevent it extra parts such as covers 10 must be arranged on the groove. Furthermore, the exposed wire harness has an unaesthetical appearance.

In consideration of these disadvantages an arrangement as shown in FIGS. 4 and 5 has been proposed. A cross-sectional configuration of a door frame 1 is modified to form a channel 11 through which a wire harness 8 extends. In order to arrange the wire harness 8 in the channel 11, however, the door frame 1 must be formed with a notch 12 which reduces a rigidity of the door frame 1 and the wire harness 8 is likely to be cut by an edge of the notch 12.

SUMMARY OF THE INVENTION

It is an object of the invention to provide an improved door for an automobile which eliminates all the disadvantages of the prior art and which does not reduce the rigidity of a door frame without requiring extra parts such as covers or the like for snugly arranging a wire harness within a channel of the door.

In order that the invention may be more clearly understood, preferred embodiments will be described, by way of example, with reference to the accompanying drawings.

DETAILED DESCRIPTION OF THE PREFERRED EMBODIMENT

Figure 1:
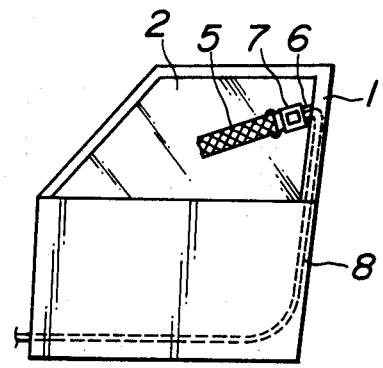
FIG. 1 is a front elevation of a door for an automobile of the prior art equipped with a shoulder belt as mentioned above.
Figure 2:
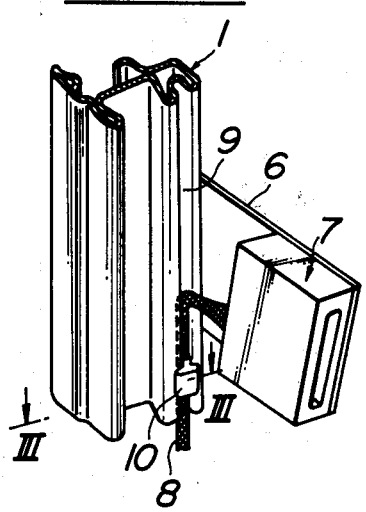
FIG. 2 is a detailed perspective view of a part of a door for an automobile of the prior art as mentioned above.
Figure 3:
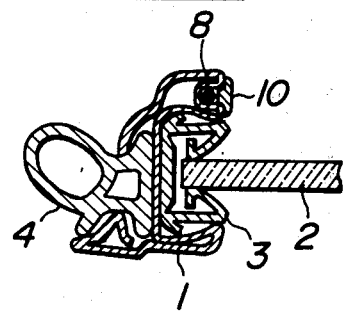
FIG. 3 is a sectional view of the door taken along the line III—III in FIG. 2.
Figure 4:
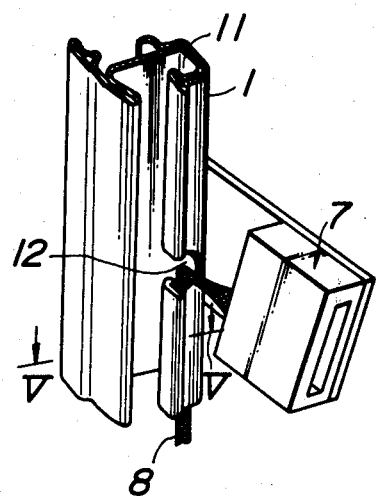
FIG. 4 is a detailed perspective view of a part of a door of an automobile as another example of the prior art as mentioned above.
Figure 5:
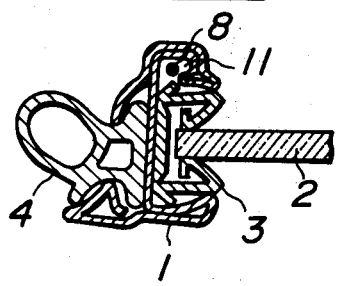
FIG. 5 is a sectional view of the door taken along the line V—V in FIG. 4.
Figure 6:
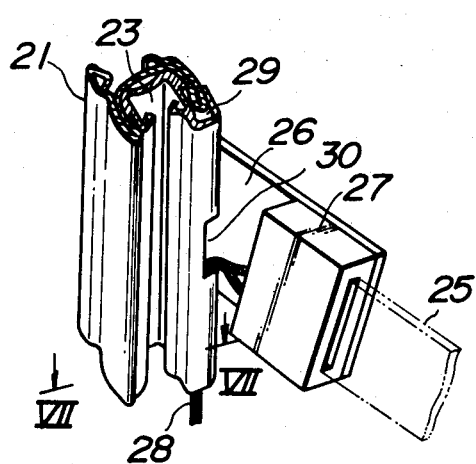
FIG. 6 is a detailed perspective view of a part of a door for an automobile according to the invention.
Figure 7:
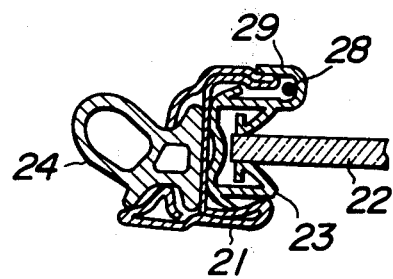
FIG. 7 is a sectional view of the door taken along the line VII—VII in FIG. 6.

Referring to FIGS. 6 and 7, a door for an automobile according to the invention comprises a metal door frame 21 and a window glass 22 which is guided by glass run rubbers 23 embraced by the door frame 21 as in the conventional manner. On the outer periphery of the door frame 21 a weatherstrip 24 is provided.

To the upper portion of the door frame 21 is fixed a support 26 at the upper end of the shoulder belt 25. The support 26 is provided with a buckle 27 for releasing the shoulder belt in an emergency. A wire harness 28 extends from the buckle 27 to a belt wearing alarm device (not shown) for warning with a signal a driver of a status that the shoulder belt is not connected to the buckle 27.

The edge of the glass run rubber 23 facing the inside of the door is formed with a channel 29 for accommodating the wire harness 28. The wire harness 28 is inserted through a notch 30 formed at the channel 29 and extends therein without exposing to the outside of the door. The end of the channel 29 is in close contact with the door frame 21 to prevent the wire harness 28 from removing from the channel.

As above described, all that is required to arrange the wire harness 28 is to insert it into the channel 29 through the notch 30 of the glass run rubber 23, as a result of which the wire harness 28 is securely retained without exposing. In this case, the rigidity of the door frame 21 is not reduced because it is not particularly cut out.

As can be seen from the above description, according to the invention a glass run rubber of a door is provided with a channel through which a wire harness extends, thereby eliminating a notch formed in a door frame which would reduce the rigidity of the door. Moreover, as the glass run rubber is generally soft or flexible, an edge of a notch at the channel does never cut the wire harness, and covers or the like for retaining the wire harness in the channel are not needed.

It is further understood by those skilled in the art that the foregoing description is preferred embodiments of the disclosed door and that various changes and modifications may be made in the invention without departing from the spirit and scope thereof.

What is claimed is:

1. In a door for an automobile vehicle having a door frame carrying a buckle, a shoulder belt and an elastic strip adapted to receive a glass window, the improvement comprising providing said elastic strip with a channel for receiving a wire harness therein connected to said buckle and further to alarm means to signal when said shoulder belt is disconnected, in response to said alarm means.

2. A door according to claim 1, wherein that portion of said elastic strip facing the inside of said door is in the form of a U-shaped channel.

3. A door according to claim 1, wherein said elastic strip is provided with a notch for inserting said wire harness into said channel.

* * * * *